Dec. 15, 1970 R. G. BRANDES 3,547,509
HOLOGRAPHIC RECORDING MEDIA
Filed Aug. 4, 1967
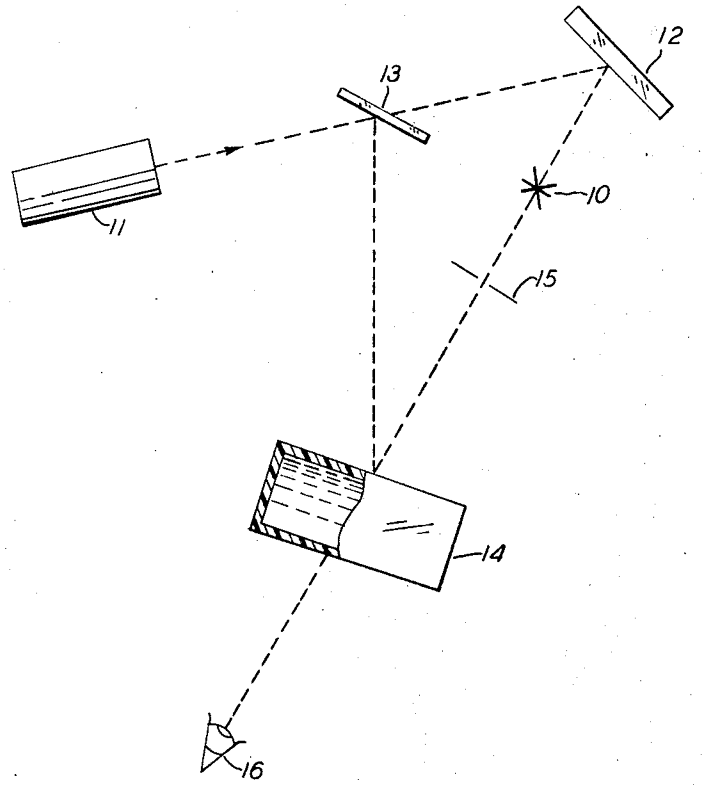
INVENTOR
R. G. BRANDES
BY
[signature]
ATTORNEY United States Patent Office 3,547,509
Patented Dec. 15, 1970

3,547,509

HOLOGRAPHIC RECORDING MEDIA

Raymond G. Brandes, Meyersville, N.J., assignor to Bell Telephone Laboratories, Incorporated, Berkeley Heights, N.J., a corporation of New York Filed Aug. 4, 1967, Ser. No. 658,438
Int. Cl. G03c 5/04
U.S. Cl. 350—3.5 1 Claim

ABSTRACT OF THE DISCLOSURE

Hologram images can be stored in liquid media having certain physical and chemical characteristics. The image lifetime is limited so that only short-term storage applications such as data-processing or display systems are anticipated. The characteristics of useful liquid media are considered in detail.

This invention relates to information storage. Specifically, it concerns devices for temporarily storing optical information in the form of holograms in liquid media.

One of the many consequences of the advent of the laser is the emergence of holography as a practical method for storing and retrieving optical information. The fundamentals of holography are now well known and have been described by Leith et al. in "Scientific American," vol. 212, No. 6, pp. 24–35, June 1965, and by Stroke, "Introduction to Coherent Optics and Holography," Academic Press, 1966. However, the application of holography to practical optical storage and display systems is quite new. Much attention has been directed to the mechanics of recording and displaying optical images and to various practical uses for such systems. Comparatively little effort has been devoted to the medium in which the optical image is stored.

Recent proposals for holography include data processing, computer application, and visual display systems similar to television and motion pictures. However, these applications share a technical requirement of the holographic system which has not been realized to date. This requirement is a reversible recording medium in which images can be recorded and displayed in rapid sequence. To achieve this requires a recording medium which is capable of recording an image and erasing the image many times a second and which can continue to function in this manner for a reasonable period of time.

This need for a reversible recording medium would apparently be served by a transparent crystal or glass containing an ion having multiple metastable electron levels. In such a medium incident photons would pump the electrons into a higher energy level and would change the absorption or scattering of the reading beam at that localized point. However, the short lifetime of most such excited states results in a low concentration of the metastable level unless inconveniently high intensities of illumination from the laser are used.

Photochromic materials have also been considered for reversible recording media but the energy exchange mechanism in these materials is inefficient.

The present invention is directed to systems incorporating various reversible recording media. These media are certain liquids either consisting of or containing photosensitive materials which have the ability to continuously erase recorded images by virtue of the molecular motion or diffusion of the activated species.

A significant attribute of liquid recording media is their availability as compared with solid materials, especially single crystals. In many cases crystals of optical quality are difficult or impossible to prepare in useful sizes and quantities. Another advantage of these media is the absence of grain and the attendant high resolution.

These and other aspects of the invention will become apparent from the following detailed description. In the drawing:

The figure is a schematic diagram illustrating a typical method of holographic information storage.

In the figure the information to be recorded is shown at 10. The subject is illuminated by the coherent light source 11 reflecting from mirror 12. A portion of the source beam, constituting the reference beam, is split off by beam splitter 13. The information beam and the reference beam are joined at an angle to one another to form an interference pattern on the hologram medium at 14. The holographic recording medium at 14 is capable of instantaneously recording a hologram of the information appearing at 10. A shutter mechanism at 15 interrupts the subject beam at desired intervals ordinarily 10 to 100 times per second. The reference beam from the beam splitter 13 reconstructs the image formed during the last frame for viewing at 16. From the point 16 a virtual image would appear at 10.

In the arrangement shown the hologram is viewed as it is formed. However, systems having more versatility would included well-known means for transmitting the hologram formed at 14 to a remote location for viewing in the liquid recording medium 14. For instance in a holographic television system the medium 14 could be replaced with a photoelectric tube such as a vidicon tube and the signals would be electrically transmitted to a receiver. The receiver would include a light beam for scanning the liquid medium of this invention to form the holographic pattern. An advanced system could transmit the holographic pattern directly through optical waveguides as described in application Ser. No. 379,175 filed June 30, 1964 by D. W. Berreman and S. E. Miller, now Pat. No. 3,410,627. However, in all these cases the liquid recording medium 14 serves essentially the same function of recording holographic images for short periods to permit rapid viewing of a series or sequence of images, and whether the hologram is formed and viewed directly or is formed and viewed remotely, as is more likely, this is the vital aspect of the invention.

The properties of the reversible recording medium 14 are prescribed as follows:

The liquid must be intrinsically photosensitive or contain a photosensitive substance which absorbs light of a given wavelength to form the holographic pattern and is thereby converted to a substance having distinctly different light scattering properties. The difference in light scattering (which may be due either to absorption or a change in refraction) which is necessary to form a useful hologram is at least one and one-half percent integrated over the recording surface. Where the photosensitive process is largely a change in refractive index in the energized regions, the change in refractice index should be at least 0.001. The change in scattering should be effective within $1\mu$ second to be useful in the systems described herein.

The decay time of the holographic pattern depends on the rate of molecular diffusion which is to a large extent a function of viscosity. As the viscosity is lowered the decay time decreases; however, the photon intensity required to produce the hologram increases. With appropriate laser power levels the hologram can be formed in aqueous solutions so it is apparent that viscosity is not a limiting parameter.

The viscosity should however be selected so that the movement of the activated species in the liquid during the time interval between the forming or recording of the hologram and the completion of the reconstruction or reading operation, is less than one-half of the spacing of the hologram grating.

The following several examples are given of specific liquid substances useful according to this invention.

Polymethylmethacrylate dissolved in chloroform to give a liquid having a viscosity in the range of 1000–10,000 centipoises the solution additionally containing benzoquinone as a sensitizer. The amount of benzoquinone used depends on the extinction coefficient of the solution. For an argon laser at 4880 A., 0.5 percent to 10 percent by weight of benzoquinone is acceptable. Other polymers such as polymethylacrylate, polymethacrylaldehyde and copolymers of these can be similarly used. Polyvinylchloride in a solvent such as para-dioxane or tetrahydrofuran is also useful.

Acrylamide in an aqueous solution with riboflavin-5-phosphate as a sensitizer is a photopolymerization system useful according to this invention. The concentration of acrylamide may vary over a wide range but 20 percent by weight is satisfactory. The amount of riboflavin-5-phosphate required is small, of the order of 0.1 percent.

Thioindigo and azo dyes may be used in appropriate transparent solvent solutions. These materials exhibit cis-trans isomerism in which conversion is effected via photon absorption.

Other substances which undergo photolysis and therefore are useful for the purposes of this invention are triarylmethyl leuconitriles, spiropyrans, 3-oxo-2,3-dihydrothionaphthene, anils of salicylaldehyde, aqueous solutions of chlorophyl and transition metal carbonyls.

As mentioned previously, the novel liquid recording media can be used for recording holographic data directly or for displaying holographic information previously recorded for instance, on photographic film or as electrical signals. The medium can be scanned with a light beam which is modulated with the holographic information by the film or electro-optically and instantly displayed. In this system the hologram in the form of a high resolution interference pattern can be written into the liquid medium with non-coherent light although there are obvious advantages to using a coherent scanning beam.

The reading beam, however, must be coherent and have the same wavelength as the source which formed the original pattern.

Various additional modifications and extensions of this invention will become apparent to those skilled in the art. All such variations and deviations which basically rely on the teachings through which this invention has advanced the art are properly considered within the spirit and scope of this invention.

What is claimed is:

1. In a holographic system comprising a coherent light source for illuminating the object of which the holographic image is to be made, means for superimposing a coherent light reference beam onto a light beam emanating from the aforesaid object and recording means for detecting the interference pattern resulting from the superposition of the said light beams the improvement comprising the provision of a liquid medium for the recording means said liquid medium selected from the group consisting of chloroform containing at least 0.5 percent of benzoquinone and sufficient polymethylmethacrylate to give a liquid having a viscosity in the range of 1000 to 10,000 centipoises and an aqueous solution of acrylamide containing at least 0.1 percent of riboflavin-5-phosphate.

References Cited

UNITED STATES PATENTS 3,407,145 10/1968 Brule ---------------- 252—300

OTHER REFERENCES

Leith, E., "Electronics," July 25, 1966, pp. 88–94.

RONALD H. SMITH, Primary Examiner

U.S. Cl. X.R.

96—27; 350—160